Oct. 7, 1952 F. W. LEE 2,613,247
METHOD OF GEOPHYSICAL PROSPECTING
Filed March 19, 1948 2 SHEETS—SHEET 1
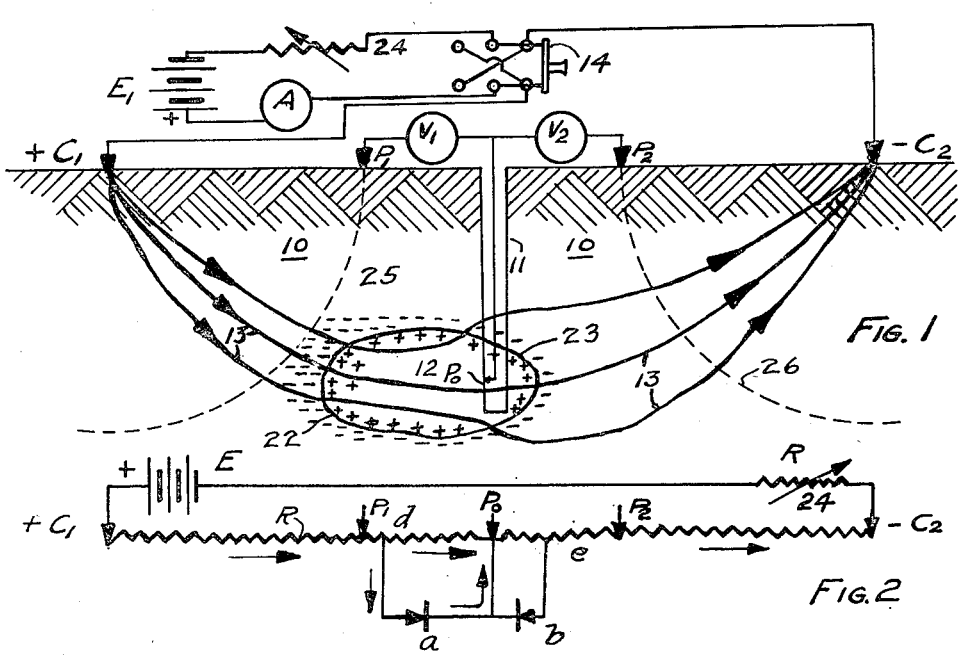
Fig. 1
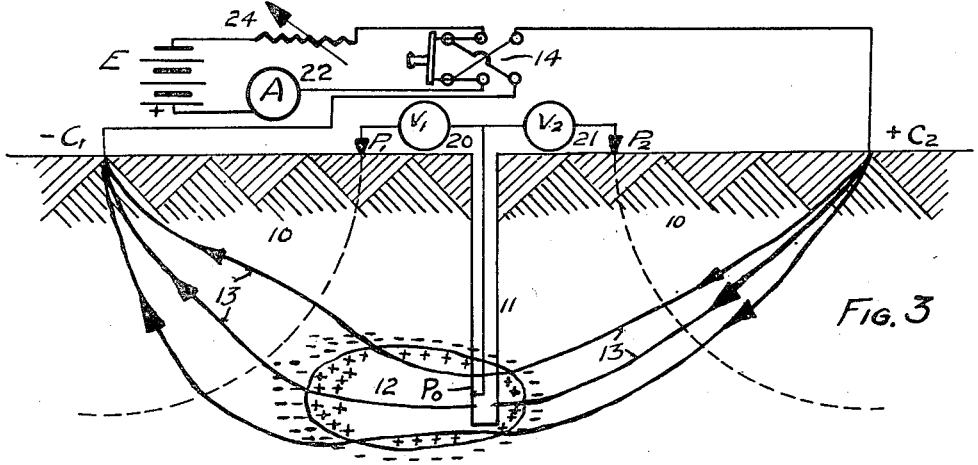
Fig. 2
Fig. 3
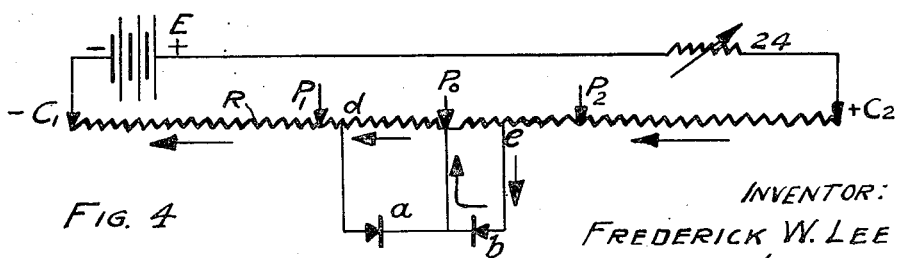
Fig. 4
INVENTOR:
FREDERICK W. LEE
ATTORNEY Oct. 7, 1952        F. W. LEE        2,613,247
METHOD OF GEOPHYSICAL PROSPECTING
Filed March 19, 1948        2 SHEETS—SHEET 2
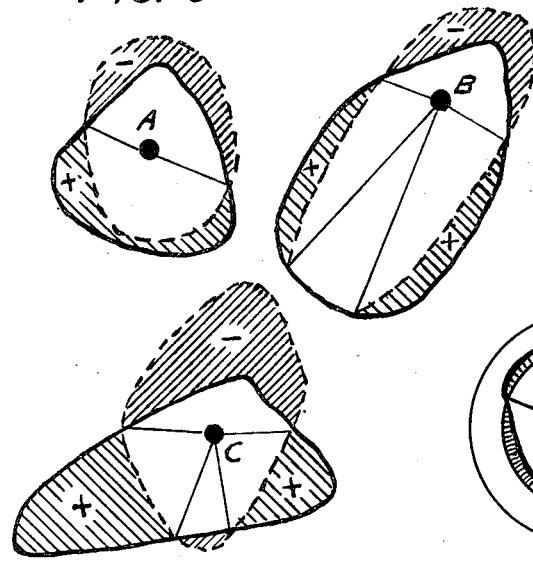
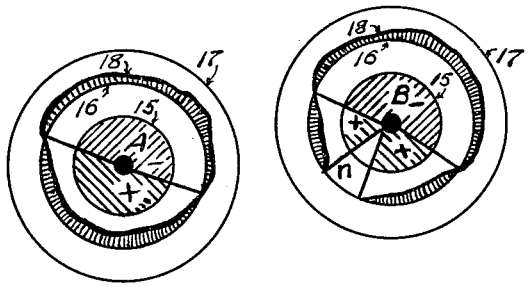
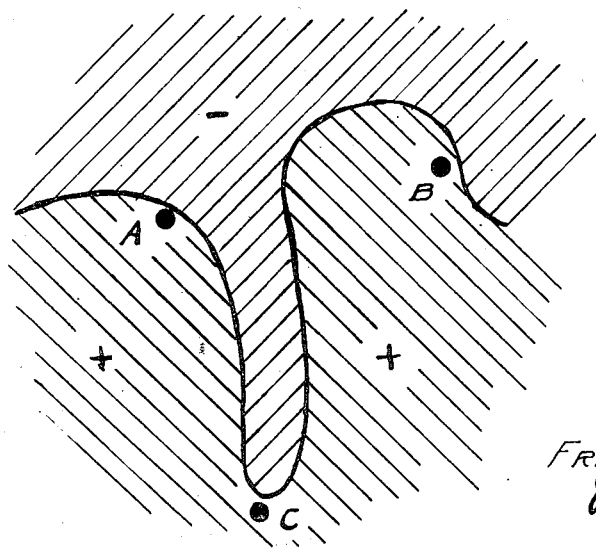
INVENTOR:
FREDERICK W. LEE
ATTORNEY Patented Oct. 7, 1952

2,613,247

UNITED STATES PATENT OFFICE 2,613,247

METHOD OF GEOPHYSICAL PROSPECTING

Frederick W. Lee, Baltimore, Md.

Application March 19, 1948, Serial No. 15,947

8 Claims. (Cl. 175—182)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates generally to a method and apparatus for geophysical prospecting, and more particularly to an electrical method of and means for detecting and locating buried polarized geologic bodies.

At the boundary between geologic bodies, such as between oil deposits or oil bearing sands and the surrounding strata or rocks, there is often a contact potential of the order of 25–100 millivolts. When an electrical current is caused to flow through the earth where such contact potentials exist, the current tends to flow through such boundaries where the polarity of the contact potentials aids the current flow, and the current tends to avoid such boundaries where the polarity opposes the current flow.

It is the object of this invention to provide a method of detecting polarized geologic bodies.

It is also an object of this invention to provide a method for delineating polarized geologic bodies.

It is a further object of this invention to provide a means for detecting and locating polarized geologic bodies.

These and other objects will become apparent to those skilled in the art from the following specification taken in connection with the drawings in which:

Fig. 1 shows a sectional elevation view of a portion of the earth near its surface with means for applying electrical potentials thereto in accordance with the principles of this invention to cause a current to flow through the earth in one direction.

Fig. 2 is a schematic electrical diagram analogous to the electrical circuit shown in Fig. 1.

Fig. 3 shows a sectional elevation view of the earth near its surface with means for applying potentials thereto in accordance with the principles of this invention to cause a current to flow through the earth in a direction opposite to the direction of current flow in Figure 1.

Fig. 4 is a schematic electrical diagram analogous to the circuit shown in Fig. 3.

Fig. 5 shows charts plotted about several stations in accordance with the teachings of this invention.

Fig. 6 shows an alternate type of chart plotted about each of the stations shown in Fig. 5.

Fig. 7 shows a delineation of the sub-soil about the stations shown in Fig. 5.

In Fig. 1 is shown a section of the earth 10, including a well 11. A unidirectional potential is applied from source E, shown as a battery, through reversing switch 14 to separate electrodes $C_1$ and $C_2$. Electrode $C_1$ is made positive to electrode $C_2$ and the current is regarded as flowing from electrode $C_1$ to electrode $C_2$, lines 13 of the current flow being shown. The vertical penetration of the current flowing in this situation is to approximately a depth which is one-third the distance separating the electrodes $C_1$ and $C_2$. A variable resistor 24 and an ammeter A are provided in series with potential source E.

Since in the situation shown in Fig. 1 it is desired to explore the level occupied by the geologic body 12, the electrodes $C_1$ and $C_2$ are placed at the earth's surface equidistantly from well 11 on opposite sides thereof, and spaced apart a distance equal to approximately three times the depth of the level to be explored. The distance from well 11 to either electrode $C_1$ or $C_2$ is therefore one-and-one-half times the depth of the level to be explored.

With current flowing from electrode $C_1$ to electrode $C_2$, approximately semispherical equipotential shells will normally exist about each electrode. Measuring electrodes $P_1$ and $P_2$ are placed on the earth's surface on opposite sides of well 11 and in line with electrodes $C_1$ and $C_2$. Electrodes $P_1$ and $P_2$ are preferably equally spaced from well 11. Electrode $P_1$ is spaced from electrode $C_1$ to contact the equipotential shell it is desired to measure. The distance in this case between electrode $P_1$ and electrode $C_1$ and between electrode $P_2$ and electrode $C_2$ is slightly more than the distance of geologic body 12 below the surface. The equipotential lines 25 and 26 ending at electrodes $P_1$ and $P_2$, respectively, are the traces in the plane of Fig. 1 of the corresponding equipotential shells. An electrode $P_0$ is placed in contact with the earth in well 11 at the depth to be explored.

Geologic body 12 is positively polarized with respect to the surrounding earth, as would be the case if geologic body 12 were oil sand and the surrounding earth were shale. Geologic body 12 is shown as having more positive charges at the end near electrode $C_1$ than at the other end. Since body 12 is polarized in a manner to aid the flow of current, when electrode $C_1$ is positive the flow of current will tend to concentrate in the body 12, as shown in Fig. 1. With the current flowing from electrode $C_1$ to electrode $C_2$, as shown in Fig. 1, the potentials between electrodes $P_1$ and $P_0$ and between electrodes $P_2$ and $P_0$ are measured by voltmeters $V_1$ and $V_2$, respectively.

In Fig. 3 the situation is the same as in Fig. 1, except that the switch 14 has been reversed so that the electrode $C_2$ is positive with respect to electrode $C_1$ and current flows from electrode $C_2$ to electrode $C_1$. Due to the fact that geologic body 12 is more positively charged at the end near negative electrode $C_1$, the lines of current flow now tend to avoid the body 12, as shown by the lines of current flow 13.

It will now be seen that charged geologic body 12 acts as a pair of oppositely connected rectifiers since the current finds an easier or more difficult path through the ends of the body in dependence on which way the current is flowing. In the condition shown in Figs. 1 and 3, when one end of geologic body 12 presents an easier path to the current flow, the other end presents a more difficult path.

The electrical circuit shown in Fig. 2 is analogous to the circuit shown in Fig. 1. In Fig. 2 source E corresponds to source E in Fig. 1, and electrodes $C_1$, $P_1$, $P_0$, $P_2$ and $C_2$ correspond to the similarly captioned electrodes in Fig. 1; resistor R between electrodes $C_1$ and $C_2$ corresponds to the resistance of the earth 10.

The current path provided by geologic body 12 is represented by the shunt path in Fig. 2, including rectifier elements $a$ and $b$. One of said shunt paths shunts the portion of resistor R adjacent to, and to the left of, electrode $P_0$ and includes rectifier $a$. The other shunt path shunts the portion of resistor R adjacent to, and to the right of, electrode $P_0$ and includes rectifier $b$. When the current flows from electrode $C_1$ to electrode $C_2$ the current will divide at point $d$, some of the current flowing through resistor R and some flowing through the shunt path containing rectifier $a$. Since, in this case, rectifier $b$ opposes current flow, the current will tend to all flow through resistor R. This corresponds to the situation in Fig. 1 in which the current tends to flow across the left boundary 22 of geologic body 12 but tends to avoid flowing across the right boundary 23.

Fig. 4 shows an electrical circuit which is the same as shown in Fig. 2 except that connections to the potential source E have been reversed to provide a circuit analogous to that shown in Fig. 3. In Fig. 4, with the current flowing from electrode $C_2$ to electrode $C_1$, the current divides at point $e$, some of the current flowing through rectifier $b$ and some flowing through resistor R. Since rectifier $a$ now opposes current flow, all of the current tends to flow along resistor between electrode $P_0$ and point $d$. This situation corresponds to Fig. 3 in which the current tends to readily flow across the right boundary 23 of geologic body 12 and avoid flowing across the left boundary 22.

It will be seen that in Fig. 2 some of the current is shunted through an additional conducting path from $d$ to electrode $P_0$, said additional conducting path including rectifier $a$, while the current is forced to flow through only one conducting path from electrode $P_0$ to point $e$. In Fig. 4, with the current reversed, the current is partially shunted through an additional conducting path from point $e$ to electrode $P_0$, said additional conducting path including rectifier $b$, but must flow through only one conducting path from electrode $P_0$ to point $d$. The existence of a shunt path causes less current to flow along the shunted portion of resistance R and causes a lower voltage to exist across the shunted portion. It will thus be seen that the presence of charged geologic body 12 has caused a relatively low reading of voltmeter $V_1$ in Figs. 1 and 2, and a relatively high reading of voltmeter $V_1$ in Figs. 3 and 4, while voltmeter $V_2$ reads relatively low in Figs. 1 and 2 and relatively high in Figs. 3 and 4.

In measuring polarization, three distinct measurements are made as follows in each azimuthal direction.

(1) $E_g$, the potential difference between electrodes $P_0$ and $P_1$ and between $P_0$ and $P_2$, with no artificial current applied to the ground.

(2) $E_1$, the potential difference between electrodes $P_0$ and $P_1$ and electrodes $P_0$ and $P_2$, with a constant current flowing between electrodes $C_1$ and $C_2$ and electrode $C_1$ having positive polarity with respect to electrode $C_2$.

(3) $E_2$, the potential difference between electrodes $P_0$ and $P_1$ and between electrodes $P_0$ and $P_2$, with the same constant current used in step (2) above, flowing between electrodes $C_1$ and $C_2$, $C_1$ having a negative polarity, with respect to $C_2$.

From the change to potentials between electrodes $P_0$ and $P_1$ and electrodes $P_0$ and $P_2$, caused by the proper applied current described in step (2) above, the positive resistivity of the ground is computed. These measurements are again computed with the current reversed, as described in step (3) above, and the apparent ground resistivity is again computed between electrodes $P_0$ and $P_1$ and electrodes $P_0$ and $P_2$. In this way, two resistivity values are obtained for each alignment of the electrodes, one when the current field flows across the well in one direction, and the other when the current field flows across the well in the opposite direction. Because of the symmetrical position of electrodes $C_1$ and $C_2$ about the central station or well 11, changes of symmetry are easily discerned. The above system of measurements is repeated with the electrodes aligned in different azimuthal directions. Usually measurements taken in three azimuthal directions will be found to give sufficient information.

Since the contact potentials to be detected are in millivolts, all fortuitous contact potentials in the exploring equipments must be eliminated to the greatest extent possible. The electrodes $C_1$, $C_2$, $P_1$, $P_0$ and $P_2$ should be chosen to eliminate ground contact potentials, and preferably of the type in which a metallic electrode is immersed in a supersaturated solution of one of its metallic salts, the solution being in a porous cup sunk in the earth's surface.

In order to detect the polarization of a buried geologic body it is necessary to choose the current values applied to the ground at electrodes $C_1$ and $C_2$ in such a way that the potential values measured between electrodes $P_0$ and $P_1$ and electrodes $P_1$ and $P_2$ are of the same order as the polarization values. Variable resistor 24 and ammeter 25 are provided to allow selection of the current giving a desirable change in voltmeter readings on reversal of switch 14.

Fig. 5 shows polar chart of resistivity plotted about wells A, B and C. In Fig. 5 the full lines are locus values of electrical conductivity between electrodes $P_1$ and $P_0$ when $C_1$ is positive to electrode $C_2$, or where the applied ground current flows toward the well 11 corresponding to the existence of positively polarized sand about the well. The dashed lines are locus values of electrical conductivity when the electrode $C_2$ is positive, with respect to electrode $C_1$, and the applied current field flows away from the well corresponding to the existence of a negatively polarized body at the location of well 11.

If the two loci about a well coincide there is a balanced polarization or no polarization in the well, yet there may be a very varied conductivity in the different azimuthal directions. Hence, it is seen that there is better conductivity for either the plus $C_1$ or the minus $C_1$ condition, depending upon the sense of polarization of the geologic body about the well. The excess polarization area in Fig. 5 has been cross-hatched in one direction where it is negative, and cross-hatched in the opposite direction where it is positive.

Oil sand polarity with reference to shale is positive. Hence, positive polarization in the stratum containing the sand indicates the direction to the oil bearing sand. The magnitude of such polarization indicates the size and proximity of the oil bearing sand. It will be obvious from an inspection of Figures 1 and 2 that for every positive charge in the oil sand at the boundary thereof, there is a corresponding opposite negative charge in the surrounding shale at the boundary. Hence, if the stratum above or below the oil bearing sand is being explored, a negative polarization indicates the location of the oil bearing sand. A stratum of sand is usually continuous, but all of the stratum does not contain oil. Those skilled in the art will know from methods heretofore developed whether they are exploring in the sand stratum or above or below it and will know whether positive or negative polarization indicates the presence of oil bearing sand.

In charting polarization in the ground, two separate factors must be taken into consideration, each requiring separate analysis:

(1) The kind and the direction of such polarization or polarization zones from the well and central station.

(2) The magnitude or intensity of polarization which exists in each respective direction.

In order to define the magnitude or intensity of polarization, the ratio of the electrical resistivity or conductivity for positive current to the same negative current applied to the ground is used as an index number.

$E_1 - E_g = E_{(+i)}$, the measured voltage due to the applied potential when electrode $C_1$ is positive relative to electrode $C_2$.

$E_2 - E_g = E_{(-i)}$, the measured voltage due to the applied potential when electrode $C_1$ is negative relative to electrode $C_2$.

If $E_{(+i)}$ and $E_{(-i)}$ are numerically equal without regard for plus and minus signs, there is no polarization. If $E_{(+i)}$ and $E_{(-i)}$ are not equal numerically, there is polarization.

K is a ratio, always less than 1 obtained by dividing the lesser value of $E_{(+i)}$ and $E_{(-i)}$ by the larger, as $$E_{(+i)} / E_{(-i)}$$

The percentage of polarization equals 100 (1—k).

In Fig. 6 concentric circles 15, 16 and 17 are drawn about each of the wells A, B and C, of Fig. 5. Circles 15, 16 and 17 represent 100% positive polarization, 0% polarization and 100% negative polarization, respectively. Circles 15 and 17 obviously will be equally spaced from the zero per cent or "unity" circle 16. The sectors including positive and negative portions of the plotted curve 18 are hatched within circle 15, as shown in Fig. 5, to show the directions of positive and negative polarization. This method of charting clearly indicates both direction and the percentage of polarization in a direct and simple manner.

Fig. 7 shows a delineation of oil bearing sands in the vicinity of wells A, B and C shown in Figures 5 and 6 and is made from the plotted charts shown in Figs. 5 and 6. In constructing the delineation shown in Fig. 7, excessive positive potentials were taken as indicating a favorable direction from the well about which the survey is made, while excessive negative polarization is taken as indicating a lack of oil sands. Assuming that Figures 5, 6 and 7 are drawn in conventional map coordinates, it will be seen that oil bearing sand is indicated to the south of well A and generally to the southeast and southwest of wells B and C, while a lack of oil bearing sand is indicated to the northwest of wells A and B and to the north of well C, hence, in Figure 7, the oil bearing sand, indicated by the plus area, is shown generally to the south of wells A, B and C, with the boundary running just north of wells A and C and passing some distance west of well B but close to well B on the northeast.

While the invention has been described with the electrode $P_0$ placed in well below the earth's surface, under certain subterranean geological conditions, the invention may be successfully practiced with electrode $P_0$ at the earth's surface.

It will be understood that the apparatus and charts described above are exemplary only and that many modifications of this invention will occur to those skilled in the art within the scope of the appended claims.

What is claimed is:

1. A method of prospecting for polarized geologic bodies below the earth's surface comprising the steps of selecting a central station, selecting a pair of potential application points one on each side of said central station and both substantially on an azimuthal line extending through said station, selecting two measuring points each of which is between said station and one of said application points, applying a first unidirectional potential of one polarity between said application points, measuring the potential between the central station and each of said two potential measuring points during application of the first unidirectional potential, applying a second unidirectional potential of the opposite polarity, measuring the potential between said measuring points and said central station during the application of said second potential, selecting at least one other pair of potential application points on a different azimuthal line, repeating with respect to the other pair of potential application points the steps of measuring potentials as set forth for a unidirectional potential of two polarities, and the steps of measuring potential as set forth for the first pair of potential application points, plotting the ground conductivity as to all azimuthal lines used for both polarities of applied potential to determine the location of adjacent polarized geologic bodies.

2. The method of claim 1 in which the steps of applying two unidirectional potentials and measuring potentials and plotting conductivity are repeated for pairs of potential application points and measuring points on six azimuthal lines.

3. The method set forth in claim 1 in which the distance between the central station and any potential application point is approximately one-and-one-half times the distance from the surface of the earth to the sublevel being explored.

4. The method set forth in claim 1 in which the potential measurements are corrected for current flow due to potentials existing in the earth.

5. A method of prospecting for polarized geologic bodies below the earth's surface comprising the steps of selecting a central station, causing an artificial induced current of a certain magnitude to flow in one direction between a pair of potential application points on the earth's surface, said points being substantially on one azimuthal line passing through said station, each of said points being on a different side of said central station, measuring the potentials existing during said current flow in said one direction between each of a pair of measuring points and the central station, each of said measuring points being between a different one of said pair of potential application points and said station, causing a current of said certain magnitude to flow in an opposite direction between said pairs of potential application points, measuring the potentials between each of said measuring points and said central station while said current flows in said opposite direction, selecting at least another pair of potential application points and another pair of measuring points on another azimuthal line, repeating with respect to the other pair of potential application points the steps, set forth above with respect to the first pair of potential application points, of causing current to flow in both directions and measuring the potentials caused thereby, plotting with respect to each azimuthal line used indications proportional to said potentials measured with current flowing in both directions to detect the location of adjacent polarized bodies.

6. The method set forth in claim 5 in which the steps are repeated for pairs of potential application points on at least six azimuthal lines.

7. The method set forth in claim 5 in which the distance between the central station and any potential application point is approximately one-and-one-half times the distance from the earth's surface to the sublevel being explored.

8. The method set forth in claim 5 in which the potentials measured are corrected for current flow caused by potentials existing in the earth not due to artificially induced currents.

FREDERICK W. LEE.

REFERENCES CITED

The following references are of record in the file of this patent:

UNITED STATES PATENTS

| Number | Name | Date |
| --- | --- | --- |
| 1,951,760 | Lee | Mar. 20, 1934 |
| 2,440,693 | Lee | May 4, 1948 |

Certificate of Correction

Patent No. 2,613,247                                                             October 7, 1952

FREDERICK W. LEE

It is hereby certified that error appears in the printed specification of the above numbered patent requiring correction as follows:

Column 4, line 26, for "change to" read *change of*; column 6, line 61, strike out "measuring potentials as set forth for" and insert instead *selecting measuring points, applying*; line 63, for "potential" read *potentials*; column 7, line 11, for "artificial" read *artificially*;

and that the said Letters Patent should be read as corrected above, so that the same may conform to the record of the case in the Patent Office.

Signed and sealed this 14th day of April, A. D. 1953.

[SEAL]

THOMAS F. MURPHY,
                                                           *Assistant Commissioner of Patents.*